(12) United States Patent
Hill

(10) Patent No.: US 6,231,947 B1
(45) Date of Patent: May 15, 2001

(54) METHOD OF FORMING WOOD-VENEERED PRODUCT

(76) Inventor: David A. Hill, 2613 NW. Robert Way, Bend, OR (US) 97701

( * ) Notice: Subject to any disclaimer, the term of this patent is extended or adjusted under 35 U.S.C. 154(b) by 0 days.

(21) Appl. No.: 09/474,876

(22) Filed: Dec. 29, 1999

(51) Int. Cl.[7] ............................ B32B 3/14; B32B 15/08
(52) U.S. Cl. ......................... 428/120; 428/98; 428/106; 428/119; 156/182; 156/304.1; 156/304.5; 156/325
(58) Field of Search .................. 428/98, 106, 119, 428/120; 156/182, 304.1, 304.5, 325

(56) References Cited

U.S. PATENT DOCUMENTS

| | | |
|---|---|---|
| 3,865,681 | 2/1975 | Beebe . |
| 4,007,569 | 2/1977 | Hascall . |
| 4,146,662 | 3/1979 | Eggers et al. . |
| 4,543,284 | 9/1985 | Baum . |
| 4,689,257 | 8/1987 | Baum . |
| 4,853,062 | 8/1989 | Gartland . |
| 4,890,656 | 1/1990 | Ohsumi et al. . |
| 4,931,124 | 6/1990 | Baum . |
| 5,071,688 | 12/1991 | Hoffman . |
| 5,074,092 | 12/1991 | Norlander . |
| 5,219,634 | 6/1993 | Aufderhaar . |
| 5,234,519 | 8/1993 | Talbot et al. . |
| 5,369,869 | 12/1994 | Bies et al. . |
| 5,439,749 | 8/1995 | Klasell et al. . |
| 5,925,211 | 7/1999 | Rakauskas . |
| 5,955,203 | 9/1999 | Briggs et al. . |

*Primary Examiner*—Richard Weisberger
(74) *Attorney, Agent, or Firm*—Kolisch Hartwell Dickinson McCormack & Heuser

(57) ABSTRACT

A method of forming a wood-veneered product. The method includes (1) providing a veneer having a main portion formed of wood and an edge portion joined to the main portion, the edge portion being formed of a material different from the wood of the main portion, (2) providing a core having an edge portion and a surface for receiving the veneer, (3) affixing the veneer to the surface of the core, so that the edge portion of the veneer is adjacent the edge portion of the core, and (4) shaping the veneer and core, so that the edge portion of the veneer is removed, to form the wood-veneered product. The method reduces waste, because it reduces the amount of wood required for the main portion of the veneer. The core and veneer may include various materials of various sizes. The core and veneer may be formed and joined in various ways. The invention also provides a wood-veneered product constructed in accordance with limitations (1)–(3).

21 Claims, 2 Drawing Sheets

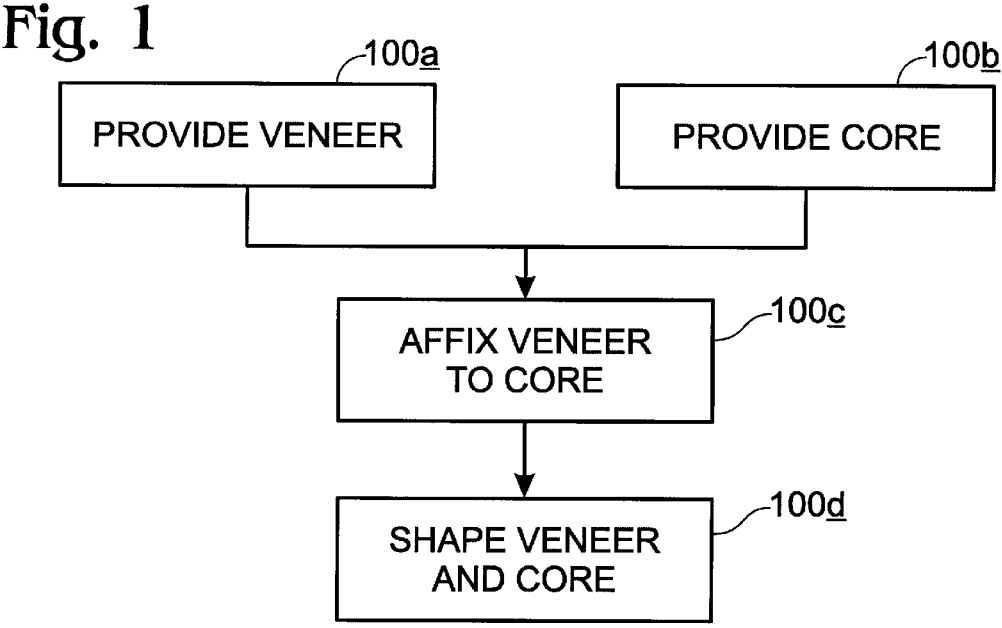
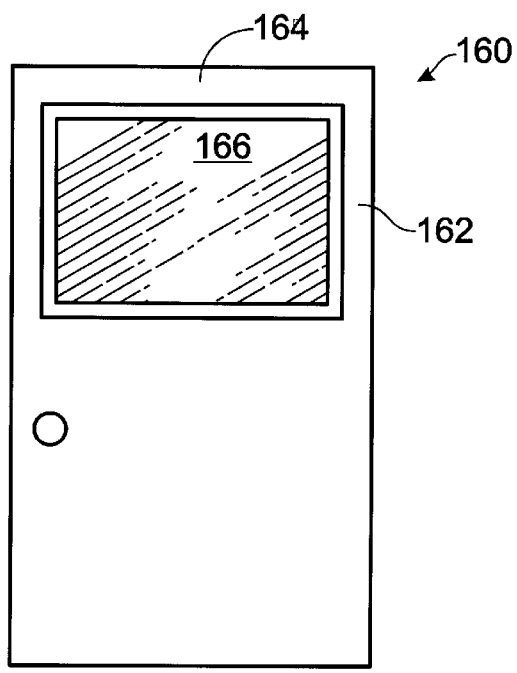
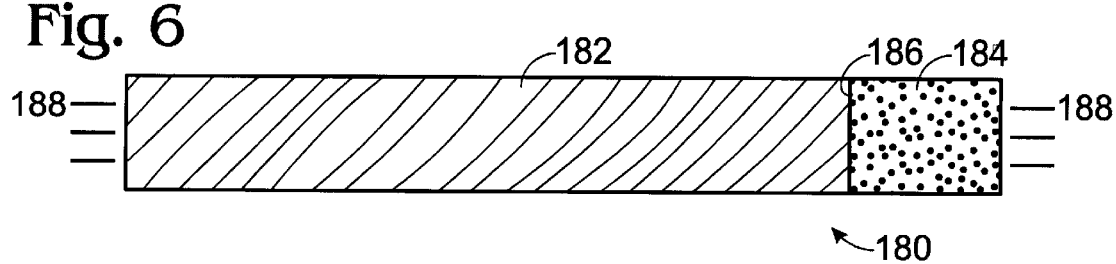

METHOD OF FORMING WOOD-VENEERED PRODUCT

FIELD OF THE INVENTION

The present invention relates to a method of forming a wood-veneered product, and more particularly to a method of forming a wood-veneered product that reduces waste of high-quality veneer.

BACKGROUND

Recent environmental regulations and depletion of old-growth forests have made it increasingly difficult and expensive to obtain high-quality lumber for use in wood products. Such products include doors, windows, furniture, cabinets, and millwork. This is particularly a problem for wood products that are stained rather than painted, because stain is less likely than paint to cover irregularities in wood.

One way to address the difficulty and expense of obtaining high-quality lumber is to use a veneer. Veneered parts are created by affixing a higher-quality veneer, such as high-grade or clear wood, over a lower-quality core, such as medium density fiberboard (MDF), particleboard, plywood, laminated veneer lumber (LVL), or finger-jointed stock. Veneered parts more efficiently utilize high-quality wood, reducing wood requirements and associated costs.

In the manufacture of some wood products, such as doors and windows, veneered parts must be reshaped, and portions of the veneer and core may be removed. For example, in forming a window, a portion of a window stile or rail may be cut away to accommodate a pane of glass. Unfortunately, the portions of wood that are removed often must be discarded, because they cannot be used for any other purpose. The costs associated with discarding such wood may be considerable. In particular, the cost of veneer typically increases faster than the size of the veneer, because larger veneers must be obtained from larger, scarcer trees.

SUMMARY OF THE INVENTION

The present invention addresses these and other shortcomings by providing a method of forming a wood-veneered product that reduces waste of high-quality veneer. The method includes (1) providing a veneer having a main portion formed of wood and an edge portion joined to the main portion, the edge portion being formed of a material different from the wood of the main portion, (2) providing a core having an edge portion and a surface for receiving the veneer, (3) affixing the veneer to the surface of the core, so that the edge portion of the veneer is adjacent the edge portion of the core, and (4) shaping the veneer and core, so that the edge portion of the veneer is removed, to form the wood-veneered product. The method reduces waste, because it reduces the amount of wood required for the main portion of the veneer. The core and veneer may include various materials of various sizes. The core and veneer may be formed and joined in various ways.

The present invention also provides a wood-veneered product that includes (1) a veneer having a main portion formed of wood and an edge portion joined to the main portion, and (2) a core having an edge portion and a surface for receiving the core. The edge portion of the veneer is formed of a different material than the main portion of the veneer, and the veneer is affixed to the surface of the core so that the edge portion of the veneer is adjacent the edge portion of the core.

Many other features, advantages, and objects of the invention will become apparent to those versed in the art upon reference to the accompanying drawings and detailed description, in which preferred embodiments incorporating the principles of the invention are disclosed as illustrative examples.

BRIEF DESCRIPTION OF THE FIGURES

FIG. 1 is a flow chart showing a method of forming a wood-veneered product in accordance with the invention.

FIG. 5 is a side elevation view of a door utilizing a wood-veneered product in accordance with the invention.

FIG. 6 is a cross-sectional view of a composite used to form veneer.

DETAILED DESCRIPTION

Figure 2:
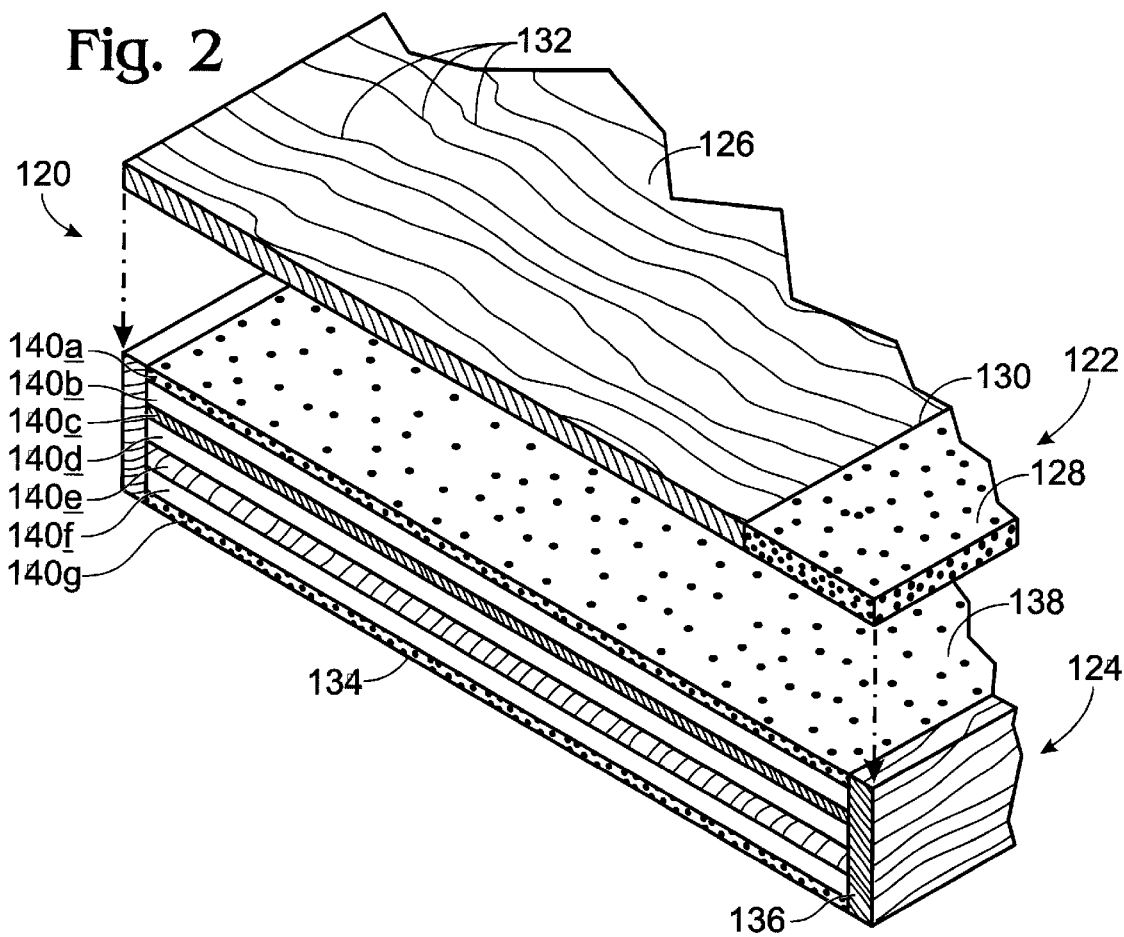
FIG. 2 is an exploded perspective cross-sectional view of a wood-veneered product in accordance with the invention.

FIG. 1 is a flowchart showing a method of forming a wood-veneered product in accordance with the present invention. First, a veneer having a main portion formed of wood and an edge portion joined to the main portion, the edge portion being formed of a material different from the wood of the main portion, is provided (block 100a). Second, a core having an edge portion and a surface for receiving the veneer is provided (block 100b). Third, the veneer is then affixed to the surface of the core, so that the edge portion of the veneer is adjacent the edge portion of the core (block 100c). Fourth, the veneer and core are then shaped, so that the edge portion of the veneer is removed, to form the wood-veneered product (block 100d). The steps shown in blocks 100a–d generally are performed in the indicated order, although the steps shown in blocks 100a,b may be reversed.

FIG. 2 is an exploded perspective cross-sectional view of a veneered wood product 120 in accordance with the invention. Veneered wood product 120 includes a veneer 122 and a core 124. Veneer 122 includes a main portion 126 and an edge portion 128 joined to main portion 126 along an edge or margin 130. Main portion 126 is formed of wood, and preferably is formed of high-grade or clear, defect-free wood having a visible wood grain 132. Most commonly, main portion 126 will be oriented so that wood grain 132 is substantially parallel or substantially perpendicular to margin 130, although other orientations may be employed. Edge portion 128 is formed of a material different from the wood of main portion 126, such as another kind of wood, and preferably is formed of a lower-quality material, such as fiberboard or finger-jointed stock.

Veneer 122 preferably has a thickness between ¹⁄₆₄th and ⅛th of an inch along a direction substantially perpendicular to core 124, although thicker and tinner veneers may be used. The preferred thickness is thin enough to reduce the amount of wood required for the veneer, yet thick enough to reduce the risk that imperfections in the core will show through the veneer or that the core will be exposed as the veneer is sanded or otherwise finished in producing the wood-veneered product.

Core 124 includes a main portion 134, an edge portion 136, and a surface 138 for receiving veneer 122. Main portion 134 may be formed of one or more materials, including medium density fiberboard (MDF), other fiberboard, particleboard, plywood, laminated veneer lumber (LVL), finger-jointed stock, and/or phenolic paper, among others. Main portion 134 may be formed as a single piece or as a composite piece. In FIG. 2, main portion 134 is formed as a composite piece having a series of layers 140a–g of different materials laminated together by an adhesive. Edge portion 136 also may be formed of one or more materials, including fiberboard and solid wood. Edge portion 136 also may be formed as a single piece or as a composite piece. In FIG. 2, edge portion 136 is formed as a single piece of wood. Surface 138 is formed from contiguous sides of main portion 134 and edge portion 136. In FIG. 2, the area of main portion 126 of veneer 122 is less than the area of surface 138.

Figure 3:
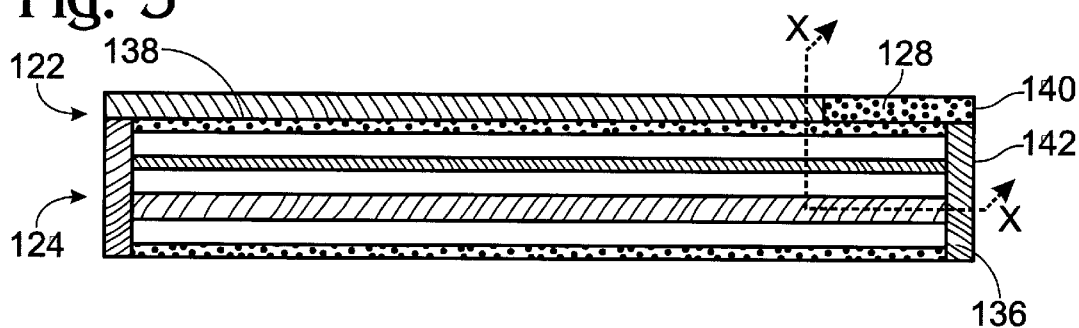
FIG. 3 is a cross-sectional view of the wood-veneered product shown in FIG. 2.

FIG. 3 is a cross-sectional view of the wood-veneered product shown in FIG. 2. Veneer 122 is affixed to surface 138 of core 124, so that edge portion 128 of veneer 122 is adjacent edge portion 136 of core 124. To facilitate proper positioning, veneer 122 is substantially the same size as surface 138, so that an edge 140 of edge portion 128 may be aligned with an edge 142 of edge portion 136. Veneer 122 may be affixed to core 124 in a variety of ways, including (1) applying an adhesive to either or both of the veneer and core, (2) bringing the veneer and core into contact, so that the adhesive is sandwiched between the veneer and core, (3) pressing the veneer and core together, and (4) applying heat to cure the adhesive. A preferred adhesive is a radio-frequency susceptible thermoset resin, such as polyvinyl acetate (PVA), which may be heated using radio-frequency radiation.

FIG. 3 also shows a shaping line X—X along which the veneer and core may be shaped to form the wood-veneered product. Portions of the veneer and core above and to the right of shaping line X—X as drawn are removed during shaping. Of course, shaping line X—X may have a variety of forms, and the portions removed may have a variety of shapes and orientations, depending on the application. The portions removed always include the edge portion of the veneer and may include at least part of the edge portion of the core. The invention also may include replacing some or all of any part of the edge portion of the core that is removed with a lower-quality material. Shaping may be performed using standard woodworking techniques, such as cutting, routing, sanding, milling, and surfacing, among others.

Figure 4:
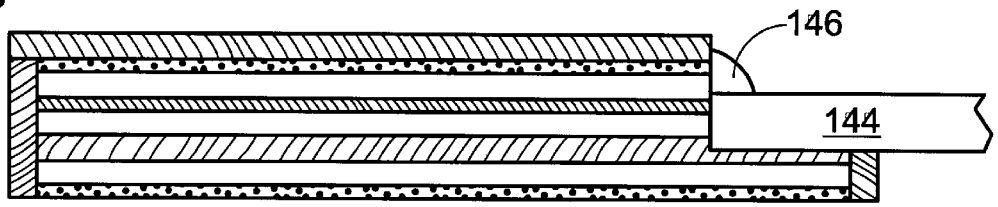
FIG. 4 is a cross-sectional view of the wood-veneered product shown in FIG. 2, in which a portion of the product has been removed and replaced with a pane of glass and a bead.

FIG. 4 is a cross-sectional view of the wood-veneered product shown in FIG. 3, in which the edge portion of the veneer and a part of the edge portion of the core have been removed and replaced with a pane of glass 144 and a bead 146 for holding the glass.

FIG. 5 is a side elevation view of a door 160 utilizing a wood-veneered product in accordance with the invention. Here, the wood-veneered product is used in the vertical stiles 162 and horizontal rails 164 that frame a window 166 in door 160. Generally, such wood-veneered product may be used for stiles, rails, and other applications, wherever a wood-veneered product is shaped to remove a portion of the wood veneer.

FIG. 6 shows a composite 180 used to form a veneer having a main portion formed of wood and an edge portion formed of a material different from the wood of the main portion. In particular, such veneer may be prepared by (1) providing wood 182 to form the main portion of the veneer, (2) providing an edge material 184 to form the edge portion of the veneer, (3) joining the wood and the edge material along a margin 186 to create composite 180, and (4) cutting or slicing the composite along parallel planes 188 to form sheets of veneer. As described above, wood 182 preferably comprises a high-grade or clear, defect-free wood, and edge material 184 preferably comprises fiberboard or finger-jointed stock, although other materials also may be used. Wood 182 and edge material 184 may be joined in various ways, including those described above for affixing the veneer to the core to form the wood-veneered product. Composite 180 may be cut in various ways, including using a veneer slicer or a gang jig saw that cuts multiple sheets simultaneously.

The invention reduces waste of wood used in the construction of wood-veneered products, reducing costs and reducing the consumption of natural resources. The reduction in costs may be dramatic. For example, $4^{3/8}$-inch clear wood stock is much less expensive than $4^{7/8}$-inch wood stock, even though it is only slightly smaller. Yet, a product produced from $4^{3/8}$-inch stock is indistinguishable from a product produced from $4^{7/8}$-inch stock, if at least one-half inch of the veneer is removed during shaping.

Although the invention has been disclosed in its preferred form, the specific embodiments thereof as disclosed and illustrated herein are not to be considered in a limiting sense, because numerous variations are possible. Applicants regard the subject matter of their invention to include all novel and non-obvious combinations and subcombinations of the various elements, features, functions, and/or properties disclosed herein. No single feature, function, element, or property of the disclosed embodiments is essential. The following claims define certain combinations and subcombinations of features, functions, elements, and/or properties that are regarded as novel and non-obvious. Other combinations and subcombinations may be claimed through amendment of the present claims or presentation of new claims in this or a related application. Such claims, whether they are broader, narrower, or equal in scope to the original claims, also are regarded as included within the subject matter of applicant's invention.

I claim:

1. A method of forming a wood-veneered product, the method comprising:

providing a veneer having a main portion formed of wood and an edge portion joined to the main portion, the edge portion being formed of a material different from the wood of the main portion;

providing a core having an edge portion and a surface for receiving the veneer;

affixing the veneer to the surface of the core, so that the edge portion of the veneer is adjacent the edge portion of the core; and shaping the veneer and core, so that the edge portion of the veneer is removed, to form the wood-veneered product.

2. The method of claim 1, wherein the core includes at least one of the following materials: fiberboard, particleboard, plywood, laminated veneer lumber, finger-jointed stock, and phenolic paper.

3. The method of claim 1, the core also having a main portion, and wherein at least part of the edge portion of the core is formed of fiberboard.

4. The method of claim 1, wherein the main portion of the veneer is formed of a higher quality material than the edge portion of the veneer.

5. The method of claim 1, wherein the main portion of the veneer is formed of clear wood.

6. The method of claim 1, wherein the thickness of the veneer along a direction substantially perpendicular to the core is less than one-fourth of an inch.

7. The method of claim 1, wherein the area of the main portion of the veneer is less than the area of the surface for receiving the veneer.

8. The method of claim 1, wherein the limitation of providing the veneer includes:

provided wood to form the main portion of the veneer;

providing an edge material to form the edge portion of the veneer;

joining the wood and the edge material to create a composite; and cutting the composite into sheets to form the veneer having a main portion formed of wood and an edge portion.

9. The method of claim 1, wherein the limitation of affixing the veneer to the surface of the core includes aligning an edge of the edge portion of the veneer with an edge of the edge portion of the core.

10. The method of claim 1, wherein the limitation of affixing the veneer to the core includes:

applying an adhesive to either or both of the veneer and core;

bringing the veneer and core into contact, so that the adhesive is sandwiched between the veneer and core; and pressing the veneer and core together.

11. The method of claim 10, wherein the limitation of affixing the veneer to the core further includes applying heat to cure the adhesive.

12. The method of claim 1, wherein the limitation of shaping the veneer and core includes at least one of the following operations: cutting, routing, sanding, milling, and surfacing.

13. The method of claim 1, wherein the limitation of shaping the veneer and core includes removing at least part of the edge portion of the core.

14. The method of claim 13, the core also having a main portion, and wherein at least part of the edge portion of the core that is removed is formed of fiberboard.

15. A method of forming a wood-veneered product, the method comprising:

a step for providing a veneer having a main portion formed of wood and an edge portion joined to the main portion, the edge portion being formed of a material different from the wood of the main portion;

a step for providing a core having an edge portion and a surface for receiving the veneer;

a step for affixing the veneer to the surface of the core, so that the edge portion of the veneer is adjacent the edge portion of the core; and a step for shaping the veneer and core, so that the edge portion of the veneer is removed, to form the wood-veneered product.

16. A wood-veneered product comprising:

a veneer having a main portion formed of wood and an edge portion joined to the main portion; and a core having an edge portion and a surface for receiving the veneer;

wherein the edge portion of the veneer is formed of a material different from the wood of the main portion of the veneer; and wherein the veneer is affixed to the surface of the core so that the edge portion of the veneer is adjacent the edge portion of the core.

17. The wood-veneered product of claim 16, wherein the core includes at least one of the following materials: fiberboard, particleboard, plywood, laminated veneer lumber, finger-jointed stock, and phenolic paper.

18. The wood-veneered product of claim 16, the core also having a main portion, wherein at least part of the edge portion of the core is formed of fiberboard.

19. The wood-veneered product of claim 16, wherein the main portion of the veneer is formed of a higher quality material than the edge portion of the veneer.

20. The wood-veneered product of claim 16, wherein the main portion of the veneer is formed of clear wood.

21. The wood-veneered product of claim 16, wherein the thickness of the veneer along a direction substantially perpendicular to the core is less than one-fourth of an inch.

* * * * *